United States Patent [19]

Takai et al.

[11] Patent Number: 4,478,463
[45] Date of Patent: Oct. 23, 1984

[54] CONICAL ROLLER BEARING

[75] Inventors: Toru Takai, Fijisawa; Kenji Takei, Hiratsuka; Youichi Nagano, Chigasaki, all of Japan

[73] Assignee: Nippon Seiko Kabushiki Kaisha

[21] Appl. No.: 449,278

[22] Filed: Dec. 13, 1982

[30] Foreign Application Priority Data

Dec. 25, 1981 [JP] Japan ............... 56-192792
Dec. 25, 1981 [JP] Japan ............... 56-192793
Jan. 28, 1982 [JP] Japan ............... 57-9370

[51] Int. Cl.³ ............................ F16C 33/76
[52] U.S. Cl. ........................ 384/482; 277/50
[58] Field of Search ........... 308/202, 207 R, 211, 308/214, 216, 217, 218, 187.1, 187.2; 277/50, 35, 189, 83, 92, 94, 152, 166

[56] References Cited

U.S. PATENT DOCUMENTS

| 2,485,011 | 10/1949 | Niessen et al. | 277/50 X |
| 3,306,683 | 2/1967 | Deuring | 308/187.2 |
| 3,425,758 | 2/1969 | Scheifele | 308/187.2 |
| 4,153,309 | 5/1979 | Markfelder et al. | 308/217 |
| 4,203,635 | 5/1980 | Reiter | 308/187.1 X |
| 4,325,591 | 3/1982 | Otto | 308/187.2 |

FOREIGN PATENT DOCUMENTS 82324  7/1981  Japan .

Primary Examiner—Stuart S. Levy
Assistant Examiner—David Werner
Attorney, Agent, or Firm—Wyatt, Gerber, Shoup, Scobey & Badie

[57] ABSTRACT

A conical roller bearing has a side plate of substantially L-shaped cross section fitted to the larger diameter side end portion of the inner peripheral surface of an outer race. The inner end surface of the side plate and the end surface of the larger diameter portion of a retainer are axially opposed to each other so that the inner end surface and the end surface of the larger diameter portion bear against each other when the cone has moved axially outwardly.

5 Claims, 12 Drawing Figures

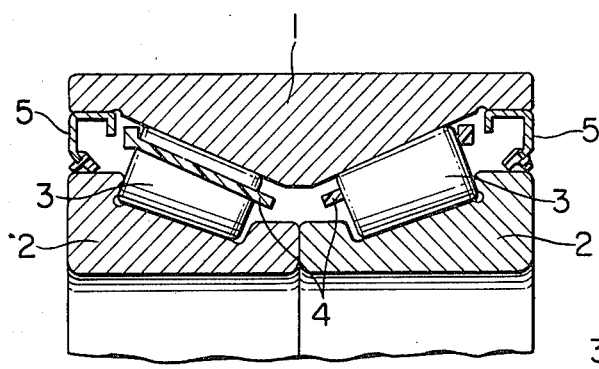
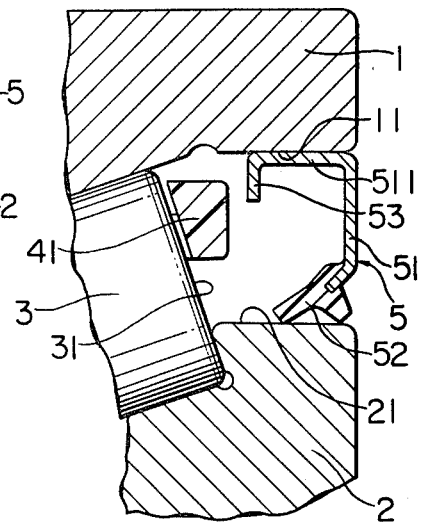
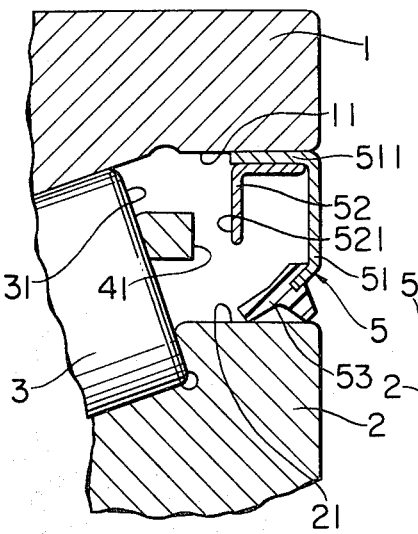
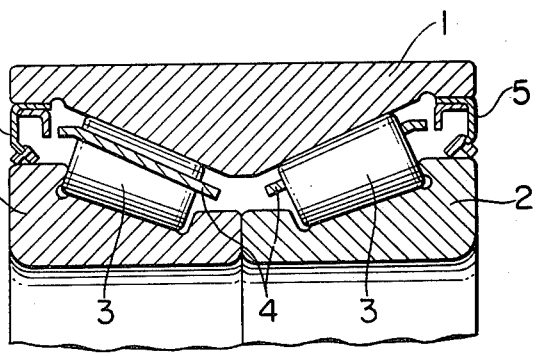

CONICAL ROLLER BEARING

BACKGROUND OF THE INVENTION

1. Field of the Invention

This invention relates to a conical roller bearing. More particularly, it relates to a conical roller bearing with seals which can be handled as an assembly when the conical roller bearing is incorporated into or removed from an apparatus.

2. Description of the Prior Art

There are various conical roller bearings which can be handled as an assembly. They include those in which separation of the various parts forming a bearing is prevented by a seal mounted on the end portion of the outer race of the conical roller bearing.

FIGS. 1 and 2 of the accompanying drawings show an example of the above-described bearing. This conical roller bearing with seals is of such a structure that when an assembly (cone) of an inner race, rollers and a retainer moves axially, the larger diameter side end portion of the rollers comes into contact only with the lips of the seals. Therefore, the lips of the seals may be injured by the rollers.

As a countermeasure therefor, a conical roller bearing shown in FIG. 3 of the accompanying drawings has been proposed in Japanese Laid-open Utility Model Application No. 82324/1981. The bearing of FIG. 3 is such that the end portion of the metallic outer ring $1a$ of a seal extends axially inwardly so that when the cone has moved, the larger diameter side end surface $3a$ of a roller bears against the inner end surface $2a$ of the metallic outer ring $1a$ to prevent the seal from being injured. However, the bearing of FIG. 3 is of such a structure that the outer ring $1a$ which is a metal contacts the larger diameter side end surface $3a$ of the roller and therefore, a harmful injury may be imparted to the important end surface $3a$ which slidably contacts the flange surface of the inner race.

Further, a double row outwardly facing conical roller bearing which comprises an outer race and two sets of assemblies (hereinafter referred to as the cone) each comprising an inner race, a plurality of conical rollers and retainers and which can be incorporated and removed with the outer race and the cone as a unit is shown in FIG. 4 of the accompanying drawings. This bearing is of such a structure that a circumferential groove is formed in the inner race and a snap ring is mounted in this circumferential groove to prevent separation, and this has led to the disadvantage that the formation of the circumferential groove and the mounting of the snap ring are cumbersome and much time is required for the manufacture of the bearing.

SUMMARY OF THE INVENTION

It is a primary object of the present invention to provide a conical roller bearing which overcomes the above-noted disadvantages.

It is another object of the present invention to provide a conical roller bearing with seals which overcomes the above-noted disadvantages.

It is still another object of the present invention to provide a double row outwardly facing conical roller bearing which eliminates the disadvantages peculiar to the separation preventing structure.

To achieve these objects, the conical roller bearing of the present invention has a side plate of substantially L-shaped cross section fitted to the larger diameter side end of the inner peripheral surface of an outer race, and the inner end surface of the side plate and the end surface of the larger diameter portion of a retainer are axially opposed to each other so that the inner end surface and the end surface of the larger diameter portion bear against each other when the cone has moved axially outwardly.

The invention will become more fully apparent from the accompanying drawings and the following detailed description.

BRIEF DESCRIPTION OF THE DRAWINGS

FIG. 5 is a cross-sectional view of a conical roller bearing according to a first embodiment of the present invention.

FIG. 6 is an enlarged view of the essential portions of FIG. 5.

FIG. 7 is a cross-sectional view of a conical roller bearing according to a second embodiment of the present invention.

FIG. 8 is an enlarged view of the essential portions of FIG. 7.

FIG. 11 is a longitudinal cross-sectional view of a non-separation type double row outwardly facing conical roller bearing according to a third embodiment of the present invention.

FIG. 12 is a cross-sectional view showing the essential portions of a modification of the third embodiment.

DESCRIPTION OF THE PREFERRED EMBODIMENTS

Figure 1:
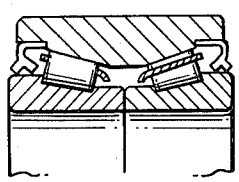
FIG. 1 is a cross-sectional view of a conical roller bearing with seals according to the prior art.
Figure 2:
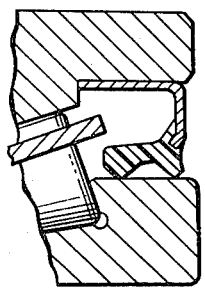
FIG. 2 is an enlarged view of the essential portions of FIG. 1.
Figure 3:
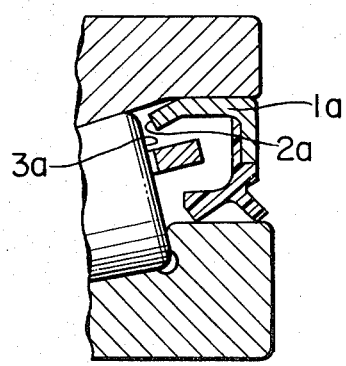
FIG. 3 is a view similar to FIG. 2 but showing another conical roller bearing with seals according to the prior art.
Figure 4:
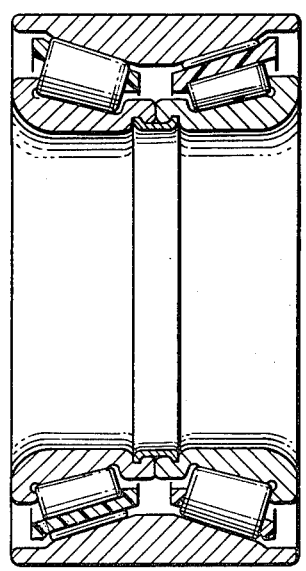
FIG. 4 is a longitudinal cross-sectional view of a non-sepration type double row outwardly facing conical roller bearing according to the prior art.

A first embodiment of the present invention shown in FIGS. 5 and 6 will hereinafter be described. This embodiment is an application of the present invention to a double row conical roller bearing comprising an outer race 1, inner races 2, rollers 3, retainers 4 and seals 5. Each of the seals 5 comprises a metal ring 51 and a lip 52 of elastic material secured to the inner periphery of the metal ring 51. The outer diameter of the fixed portion 511 of the metal ring 51 is fitted in the inner diameter 11 of the end of the outer race 1 and the lip 52 is in contact with or in proximity to the outer diameter 21 of the inner race 2 to thereby seal the bearing. The inner end portion of the fixed portion 511 is bent and formed with an inwardly directed flange 53 extending radially inwardly.

On the other hand, each of the retainers 4 is formed of a relatively soft material such as plastic and has an outwardly directed flange 41 extending radially outwardly on the side edge portion of large diameter.

The inwardly directed flange 53 and the outwardly directed flange 41 are axially opposed to each other. When the cone has moved axially outwardly, the inwardly directed flange 53 and the outwardly directed flange 41 bear against each other so as not to separate the outer race 1 and the cone from each other.

The present embodiment is constructed as described above and therefore, when the cone has moved axially, the outwardly directed flange of the retainer strikes against the inwardly directed flange of the seal, whereby separation of the bearing is prevented. Consequently, in the present embodiment, the lips of the seals and the end surfaces of the rollers are not damaged as in the prior art conical roller bearing with seals. Further, if an elastic, relatively soft material such as plastic is used for the retainers as in the present embodiment, even if the movement of the cone is impactful, the force from the inwardly directed flange of the seal is elastically absorbed to prevent the retainers from being damaged or, even if the movement of the cone acts with a relatively strong force, the outwardly directed flange of the retainer is elastically deformed so that it spreads in the direction of the end surface of the roller and can contact the end surface of the roller which is a hard material, thereby receiving the force.

The spacing between the inner end edge of the lip of the seal and the larger diameter side end surface of the roller is of such dimensions that when the cone has moved axially outwardly, the inwardly directed flange 53 and the outwardly directed flange 41 first contact each other and the inner end edge of the lip and the larger diameter side end surface of the roller do not contact each other, but said spacing may sometimes be selected to such dimensions that the inwardly directed flange and the outwardly directed flange contact each other after the inner end edge of the lip and the larger diameter side end surface of the roller have lightly contacted each other in the elasticity range of the lip. Further, of course, the inwardly directed flange and the outwardly directed flange are not restricted in shape and material to the shown embodiment if they have the previously described function.

A second embodiment of the present invention shown in FIGS. 7 and 8 will now be described. This embodiment is an application of the present invention to a double row conical roller bearing comprising an outer race 1, inner races 2, rollers 3, retainers 4 and seals 5. Each of the seals 5 comprises a metal ring 51 of substantially L-shaped cross section, a lip 53 of elastic material secured to the inner periphery of the metal ring 51, and an inner ring 52 of L-shaped cross section to be pushed against the retainer which is fitted in the inner diameter of the fixed portion 511 of the metal ring 51. The outer diameter of the fixed portion 511 is fitted in the inner diameter 11 of the end of the outer race 1 and the lip 53 is in contact with or in proximity to the outer diameter 21 of the inner race 2, thereby sealing the bearing. The inner end surface 521 of the inner ring 52 is axially opposed to the larger diameter side end portion 41 of the retainer 4 and, when the cone has moved axially outwardly, the larger diameter side end portion 41 bears against the inner end surface 521.

Figure 9:
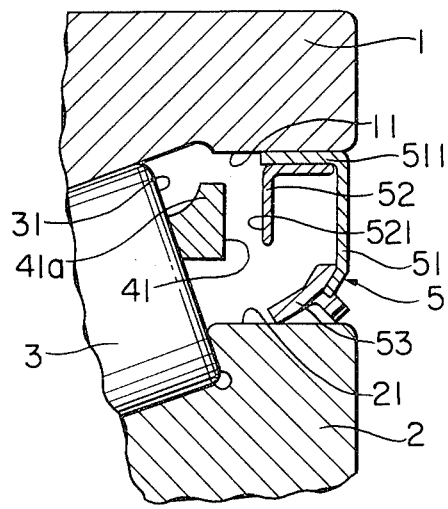
FIG. 9 is an enlarged cross-sectional view showing the essential portions of a modification of the second embodiment.

Referring now to FIG. 9 which shows a modification of the second embodiment, the larger diameter side end portion 41 of the retainer 4 has a radially outwardly extending flange portion 41a.

Figure 10:
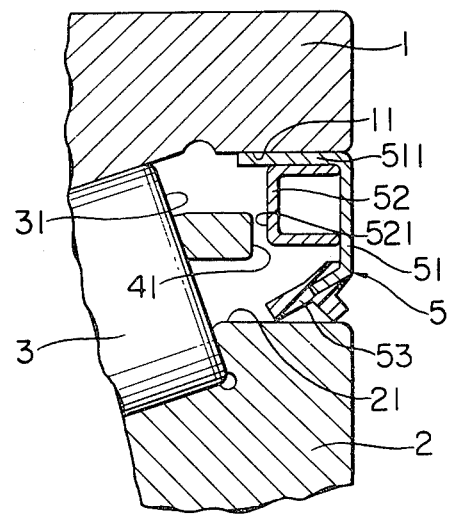
FIG. 10 is an enlarged cross-sectional view showing the essential portions of another modification of the second embodiment.

FIG. 10 shows another modification of the second embodiment in which the inner ring 52 of L-shaped cross section in the embodiment of FIGS. 7 and 8 is replaced by an inner ring 52 of U-shaped cross section and the strength of this inner ring is enhanced.

As can be understood from the second embodiment, when the cone has moved axially outwardly, the larger diameter side end surface of the retainer bears against the inner end surface of the inner ring to thereby prevent separation of the bearing. Consequently, the second embodiment also provides a conical roller bearing with seals in which the lips of the seals and the end surfaces of the rollers are not damaged as in the prior art conical roller bearing with seals and separation is prevented.

The spacing between the inner end edge of the lip of the seal and the larger diameter side end surface of the roller is of such dimensions that when the cone has moved axially in FIGS. 7 and 8, the inner end surface of the inner ring and the larger diameter side end surface of the retainer first contact each other and the inner end edge of the lip and the larger diameter side end surface of the roller do not contact each other, but said spacing may sometimes be selected to such dimensions that the inner end surface of the inner ring and the larger diameter side end surface of the retainer contact each other after the inner end edge of the lip and the large diameter side end surface of the roller have lightly contacted each other in the elasticity range of the lip. Further, of course, the inner ring is not restricted in shape and material to the shown embodiment if it has said function.

A third embodiment shown in FIG. 11 will now be described. The non-separation type outwardly facing conical roller bearing according to this embodiment comprises an outer race 1, two sets of assemblies (cone) each comprising an inner race 2, a plurality of conical rollers 3 and a retainer 4, and two side plates 5. The inner diameter 11 of the opposite ends of the outer race 1 is of a cylindrical shape. The side plates 5 of substantially L-shaped cross section are fitted to the inner diameter 11. The inner end surface 51 of each of the side plates 5 and the larger diameter side end surface 41 of the retainer 4 are axially opposed to each other so that when the cone has moved axially outwardly, said two end surfaces 41 and 51 come into contact with each other and the outer race 1 and the cone are not separated.

Referring to FIG. 12 which shows a modification of the third embodiment, a seal lip 61 is attached to the inner diameter side end portion of each of side plates 5. The inner end of the seal lip 61 is in contact with or in proximity to the outer diameter surface of the inner race 2 to enhance the sealing effect.

As described above, the separation preventing structure of the non-separation type double row outwardly facing conical roller bearing according to the third embodiment has side plates mounted on the inner diameter of the outer race and therefore, the inner diameter of the outer race on which the side plates are mounted is of a very simple configuration and the mounting of the side plates can be accomplished by forcing them from the sides of the outer race and thus, assembly can be accomplished very simply.

We claim:

1. In a conical roller bearing having an outer race and an inner race spaced radially and defining tapered bearing surfaces spaced further apart at the axially outer end portion of said bearing surfaces, a plurality of rollers held between said inner race and said outer race, a retainer holding said rollers, and a seal fitted between the axially outer end portions of said outer race and said inner race, said seal having a rigid portion fitted to the axially outer portion of said outer race and an elastomeric portion positioned adjacent said inner race, the improvement wherein said retainer includes an outer portion extending axially outwards from said rollers and said rigid portion includes means extending radially inwards from said outer race at a position adapted to engage the adjacent outer portion of said retainer as said retainer shifts axially outwards relative said outer race for preventing the axially outer end surfaces of said rollers from engaging any portions of said seal, said rigid portion including a circumferential member fixed to the inner radial surface of the outer end portion of said outer race, and said means includes an angled member having a circumferential portion fitted to the radially inner surface of said circumerfential member and a flange portion depending radially inwards of the axially inner portion of said circumferential portion.

2. A conical bearing according to claim 1, said angled member having a support portion extending axially outwards from a radially inner portion of said flange portion.

3. A conical bearing according to claim 1, the outer portion of said retainer includes an enlarged portion extending radially outwards.

4. A conical roller bearing according to claim 1, wherein said retainer is formed of a plastic material.

5. A conical roller bearing according to claim 4, the outer portion of said retainer including means formed by an enlarged portion thereof for deforming when brought into sufficient pressure engagement with said rigid portion during axially outer movement thereof so as to spread said enlarged portion radially to protect the axially outer surface of said rollers.

* * * * *